US009692791B1

United States Patent
Mishra et al.

(10) Patent No.: US 9,692,791 B1
(45) Date of Patent: Jun. 27, 2017

(54) NETWORK-BASED SECURITY SERVICES FOR SOFTWARE APPLICATIONS

(71) Applicant: Verizon Patent and Licensing Inc., Arlington, VA (US)

(72) Inventors: Siddharth Mishra, San Francisco, CA (US); Jeffrey R. Stribling, Menlo Park, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/077,723

(22) Filed: Mar. 22, 2016

(51) Int. Cl.
H04L 29/06 (2006.01)
(52) U.S. Cl.
CPC .............. *H04L 63/20* (2013.01); *H04L 63/08* (2013.01); *H04L 63/10* (2013.01); *H04L 63/1433* (2013.01); *H04L 63/1441* (2013.01)
(58) Field of Classification Search
CPC ................... G06F 21/50; G06F 21/566; H04L 63/0227–63/0281; H04L 63/10; H04L 63/102; H04L 63/1433–63/1441; H04L 63/1483; H04L 63/20–63/205; H04L 67/10; H04L 67/14–67/148
See application file for complete search history.

(56) References Cited

U.S. PATENT DOCUMENTS

2005/0273850 A1* 12/2005 Freund ................ H04L 63/0227
726/14
2008/0229088 A1* 9/2008 Barth .................. H04L 63/0263
713/1
2012/0278886 A1* 11/2012 Luna ..................... G06F 21/552
726/22

* cited by examiner

*Primary Examiner* — Alexander Lagor
*Assistant Examiner* — Kevin Bechtel

(57) ABSTRACT

A software application may be registered for network-based security services that help ensure that the software application only communicates with network devices (e.g., application servers) for which permission is expressly given or network devices otherwise deemed trustworthy. A network server may monitor network traffic originating from the software application installed on a user device. When the software application causes the user device to communicate with a network device for which permission has not been given and/or that is untrustworthy (e.g., for having a reputation of being associated with malicious software), the network server may prohibit the software application from sending information to the network device.

20 Claims, 13 Drawing Sheets

400

| App Security Info | |
|---|---|
| App Name: | App_1.0 |
| App Signature: | app-abc |
| Known App Server | Server IP Address |
| app server-1 | 001.001.001.001 |
| app server-2 | 002.002.002.002 |
| app server-3 | 003.003.003.003 |
| . . . | . . . |

NETWORK-BASED SECURITY SERVICES FOR SOFTWARE APPLICATIONS

BACKGROUND

Wireless telecommunication networks and other types of networks (e.g., the Internet) have made a wide variety of services available to users. Examples of such services may include social networking services, banking services, communication services (e.g., email, instant messaging, and video calls), etc. Such services are often available to users via an application (also referred to herein as "app") or another type of software that may be downloaded and/or installed onto a user device, such as a smartphone, a laptop computer, a desktop computer, etc.

A pervasive concern in providing such services is ensuring that applications installed on a user device are safe from being controlled or influenced by unauthorized software programs (e.g., malware, spyware, etc.). For instance, an application that is downloaded and installed onto a user device may include a compromised version of the application. The compromised application may include instructions that cause the user device to perform one or more operations that were not intended by the original developers of the application. Examples of such operations may include covertly harvesting personal or otherwise sensitive information and transmitting the information to a clandestine application server or another type of network device.

Depending on the scenario, the covert or unintended operations may become part of the application in a number of ways. For example, the application may have been developed using an integrated development environment (IDE) that (unbeknownst to the developer) introduced malware, spyware, or other types of unwanted software into the application during the development process. As another example, after an application becomes available to download and install, an unauthorized individual (such as a so-called hacker) may obtain the source code of the application by downloading and decompiling an official version of the application. The individual may then introduce new functions or operations into the source code and/or modify existing source code functions or operations. The compromised application may then be uploaded to an app server that may include a virtual store, library, or other platform that may enable users to download and install the compromised application.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 4 is a block diagram of an example data structure that logically associates an application with network devices deemed appropriate for the application to communicate with;

FIG. 5 is a flowchart diagram of an example process for determining whether an unknown network device is appropriate for an application to communicate with;

FIG. 8 is a block diagram of an example of determining whether certain application servers are appropriate for an application to communicate with;

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein may be used to enhance the security of a user device by ensuring that an application (also referred to herein as an "app") installed on the user device is communicating with known and trusted network devices (e.g., application servers, web servers, File Transfer Protocol (FTP) servers, etc.). For example, an individual or organization may develop an app that may be installed on user devices, such as smartphones, laptop computers, desktop computers, etc. The app may include functions that cause the user device to communicate with one or more network devices, such as an application server.

As such, the individual or organization may register the app with an app security server that may monitor network traffic associated with the app (also referred to herein as "app traffic") to ensure that the app only communicates with known or otherwise trusted network devices. One example of such devices may include a network device that was explicitly identified as appropriate by the individual or organization that registered the app for the app security services. Another example may include network device that may not have been explicitly identified as appropriate but that is nevertheless commonly known and trusted to not to be involved with malicious software.

Yet another example may include a network device that may not have been explicitly identified as appropriate or that is well-known to be safe, but that an authorized entity (such as the individual or organization that registered the app) indicates or confirms is appropriate for the application to communicate with. If or when the app security server determines that the application is communicating with an unauthorized or inappropriate network device, the app security server may prohibit further communications by, for example, blocking network traffic from the user device to the unauthorized network device. As such, techniques described herein provide a network-oriented solution for ensuring that an application installed on a user device is operating as intended and/or has not been compromised by malicious software.

Figure 1:
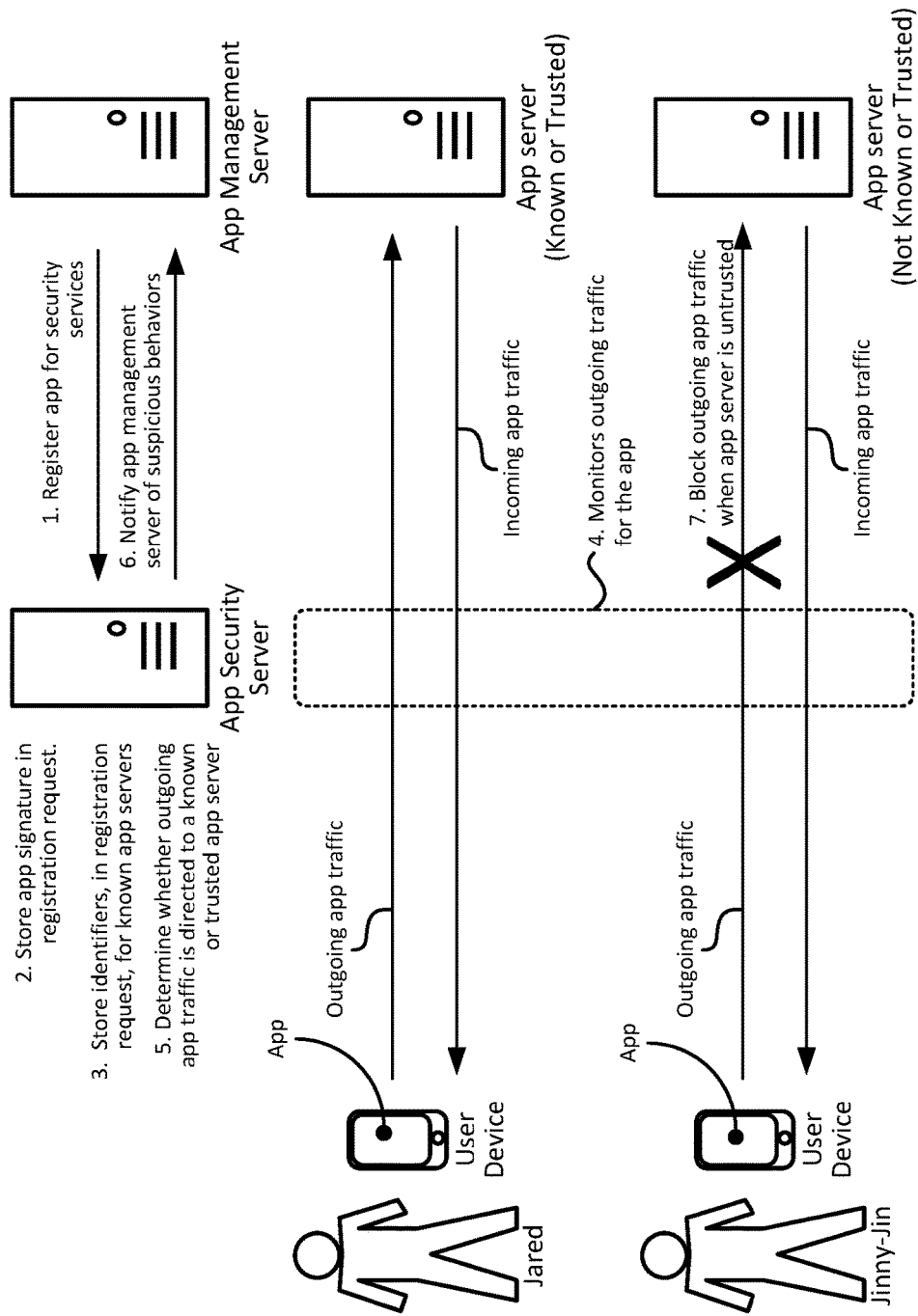
FIG. 1 illustrates an example overview of an implementation described herein.

FIG. 1 illustrates an example overview of an implementation described herein. As shown, a device, such as an application management server, may register an app with an app security server (at 1). Registering the app may include providing the app security server with a signature (e.g., an identifier) of the app and identifiers of network devices (such as app servers) that the app is designed to communicate with (also referred to herein as "known application servers"). The app security server may store a record of the app signature and the identifiers of the known app servers (at 2 and 3).

At some point, copies of the registered app may be downloaded and installed by user devices. The app may cause the user devices to communicate with one or more network devices (such as app servers), which may involve one or more networks, such as a wireless telecommunications network, the Internet, etc. The app security server may monitor outgoing application traffic, which may include information sent by the application to a particular app server (at 4). Based on the app signature provided to the app security server when the app was registered, the app security server may identify the app corresponding to the outgoing application traffic and an app server with which the app is communicating.

Additionally, the app security server may determine whether the app server, with which the app is communicating, is known to the app security server (e.g., whether the app is designed and intended to communicate with the particular app server). The app security server may determine whether the app server is known because the app server may have been identified as a safe network device for the app when the app was being registered (e.g., at 1). If an app server is a known app server, the app security server may continue to permit the app to communicate with the app server. However, if the app server is not known, the app security server may perform one or more additional operations.

For example, the app security server may determine whether the app server, with which the app is communicating, is a trusted app server or an untrusted application server. A trusted app server may include an app server that was not explicitly identified when the app was being registered, but that is nevertheless frequently contacted by user device apps and/or has a reputation to not be associated with security threats, malicious software, etc. By contrast, an untrusted application may include an app server with a history or a reputation of being associated with security threats, malicious software, etc.

Additionally, or alternatively, the app security server may notify the app management server that the application is communicating with a suspicious app server (e.g., an application server that was not identified when the application was registered with the application security server) (at 6). In some implementations, the app management server may respond by indicating whether the app is operating as intended and/or should be permitted to continue communicating with the suspicious app server. In some implementations, the information from the app management server may originate from a software developer (or another authorized individual) with access to the app management server.

In some implementations, the app security server may automatically block the outgoing app traffic and/or notify the user (e.g., the developer) associated with the app. In some implementations, the user may have the automatic block removed by indicating to the app security server that, for example, the app server is a safe network device. In some implementations, the user may indicate that the app server is not to be trusted, and the app security server may continue to block outgoing app traffic from the app to the app server, which may be automatically applied to other instances of the app that may be installed on other user devices.

Figure 2:
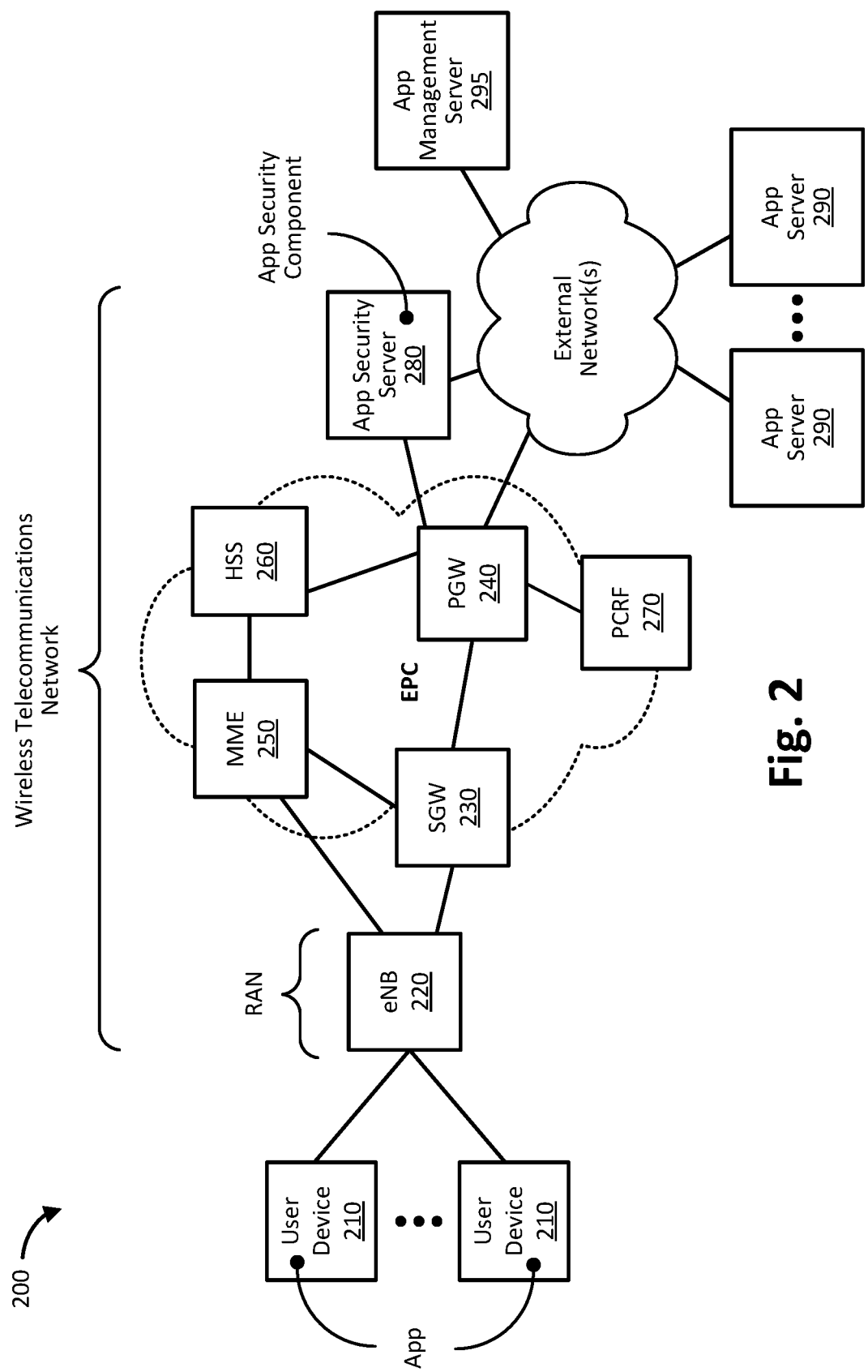
FIG. 2 is a diagram of an example environment in which systems and/or methods described herein may be implemented.

FIG. 2 is a diagram of an example environment 200 in which systems and/or methods described herein may be implemented. Environment 200 may include user devices 210, a wireless telecommunications network, external networks, app servers 290, and app management server 295. The wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, radio access networks (RANs) that include one or more base stations, some or all of which may take the form of enhanced node Bs (eNBs) 220, via which user devices 210 may communicate with the EPC network.

The EPC network may include Serving Gateway (SGW) 230, PDN Gateway (PGW) 240, Mobility Management Entity (MME) 250, Home Subscriber Server (HSS) 260, Policy and Charging Rules Function (PCRF) 270, and/or app security server 280. As shown, the EPC network may enable user devices 210 to communicate with an external network, such as a Public Land Mobile Networks (PLMN), a Public Switched Telephone Network (PSTN), and/or an Internet Protocol (IP) network (e.g., the Internet). Additionally, the external network may include, or be connected to, app servers 290 and/or app management server 295.

User device 210 may include a portable computing and communication device, such as a personal digital assistant (PDA), a smart phone, a cellular phone, a laptop computer with connectivity to the wireless telecommunications network, a tablet computer, etc. User device 210 may also include a non-portable computing device, such as a desktop computer, a consumer or business appliance, or another device that has the ability to connect to a RAN of the wireless telecommunications network. User device 210 may also include a computing and communication device that may be worn by a user (also referred to as a wearable device) such as a watch, a fitness band, a necklace, glasses, an eyeglass, a ring, a belt, a headset, or another type of wearable device. User device 210 may be capable of downloading, installing, and/or executing apps, which may be available from a server (or another type of network device) operating as a virtual store, an application library or repository, or another type of service from which user device 210 may obtain apps. In some implementation, an app installed on user device 210 may cause user device 210 to communicate with one or more network devices, such as app servers 290.

eNB 220 may include one or more network devices that receives, processes, and/or transmits traffic destined for and/or received from user device 210 (e.g., via an air interface). eNB 220 may be connected to a network device, such as site router, that functions as an intermediary for information communicated between eNB 220 and the EPC.

SGW 230 may aggregate traffic received from one or more eNBs 220 and may send the aggregated traffic to an external network or device via PGW 240. Additionally, SGW 230 may aggregate traffic received from one or more PGWs 260 and may send the aggregated traffic to one or more eNBs 230. SGW 230 may operate as an anchor for the user plane during inter-eNB handovers and as an anchor for mobility between different telecommunication networks. PGW 240 may include one or more network devices that may aggregate traffic received from one or more SGWs 230, and may send the aggregated traffic to an external network. PGW 240 may also, or alternatively, receive traffic from the external network and may send the traffic toward user device 210 (via SGW 230 and/or eNB 220).

MME 250 may include one or more computation and communication devices that act as a control node for eNB 220 and/or other devices that provide the air interface for the wireless telecommunications network. For example, MME 250 may perform operations to register user device 210 with the wireless telecommunications network, to establish bearer channels (e.g., traffic flows) associated with a session with user device 210, to hand off user device 210 to a different eNB, MME, or another network, and/or to perform other operations. MME 250 may perform policing operations on traffic destined for and/or received from user device 210.

HSS 260 may include one or more devices that may manage, update, and/or store, in a memory associated with HSS 260, profile information associated with a subscriber (e.g., a subscriber associated with user device 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with user device 210. Additionally, or alternatively, HSS 260 may perform authentication, authorization, and/or accounting operations associated with the subscriber and/or a communication session with user device 210.

PCRF 270 may receive information regarding policies and/or subscriptions from one or more sources, such as subscriber databases and/or from one or more users. PCRF 270 may provide these policies to PGW 240 or another device so that the policies can be enforced. As depicted, in some implementations, PCRF 270 may communicate with PGW 240 to ensure that charging policies are properly applied to locally routed sessions within the telecommunications network. For instance, after a locally routed session is terminated, PGW 240 may collect charging information regarding the session and provide the charging information to PCRF 270 for enforcement.

App security server 280 may include one or more computing devices, such as a server device or a collection of server devices, capable of providing security services for apps installed on user devices 210. In some implementations, app security server 280 may be implemented via hardware circuitry and/or software logic on the same device (or set of devices) as PGW 240 and/or on another device in a signal path between user device 210 and the external network. As shown, app security server 280 may include an app security component (which may include one or more software programs) that enable app security server 280 to perform one or more of the operations described herein. For example, app security server 280 may monitor network traffic that corresponds to a particular app installed on user device 210. Based on the network traffic, app security server 280 may identify a particular app, corresponding to the network traffic, based on an app signature in the network traffic. App security server 280 may also, or alternatively, identify a network device (e.g., app server 290) that is communicating with user device 210 via the app. App security server 280 may determine whether the network traffic is indicative of an intended function of the app, and depending on whether the app is operating as intended, may permit or prohibit further communications between the app and the identified network device (e.g., app server 290). In some implementations, app security server 280 may determine that the app server is unsafe in general and may prohibit all traffic from app server 290 from reaching any user device 210 connected to the wireless telecommunications network. In some implementations, app security server 280 may store an app server's domain name, IP address, and/or other information relating to app server 290 in a repository for representing untrusted app servers. The repository may be used for providing network-based security services to other apps.

App server 290 may include one or more computing devices, such as a server device or a collection of server devices, capable of communicating with an app installed on user device 210. In some implementations, the app installed on user device 210, and app server 290, may provide users with access to a particular network service, such as a social networking service, an online banking service, etc. In some implementations, app server 290 may be involved with malicious software incorporated into the application installed on user device 210. For example, the malicious software may cause user device 210 to collect personal, financial, or otherwise sensitive information from user device 210 and may cause user device 210 to provide the information to app server 290.

App management server 295 may include one or more computing devices, such as a server device or a collection of server devices, capable of registering software applications for network-based security services as described herein. App management server 295 may also receive notifications from app management server 295 about apps that have been compromised by malicious software (e.g., spyware, malware, etc.). In some implementations, app management server 295 may provide the notification to one or more users in charge of managing security issues involving the corresponding app. App management server 295 may also, or alternatively, provide app security server 280 with instructions about how to handle (e.g., whether or not to permit) network traffic from an app to an unknown network device (e.g., an app server that app security server 280 was not able to confirm as trustworthy).

Figure 3:
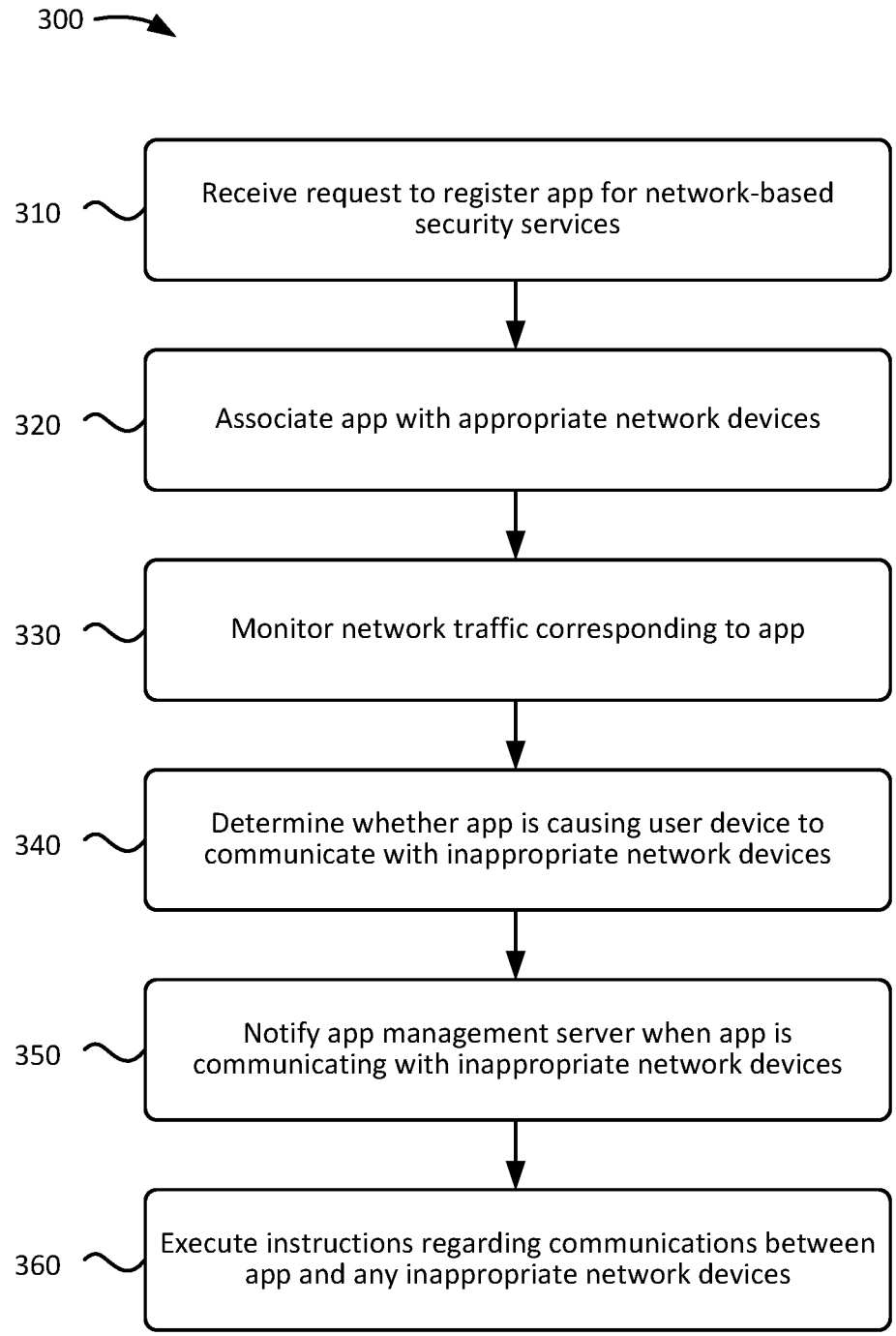
FIG. 3 is a flowchart diagram of an example process for ensuring that an application is communicating with appropriate network devices.

FIG. 3 is a flowchart diagram of an example process 300 for ensuring that an app is communicating with appropriate network devices. In some implementations, process 300 may be implemented by a network device, such as app security server 280.

As shown, process 300 may include receiving a request to register an app for network-based security services (block 310). For example, app security server 280 may receive a request from app management server 295 to register a particular app for one or more types of security services offered by app security server 280, such as ensuring that the app only communicates with known, trusted, or otherwise appropriate network devices. In some implementations, the request may be received from another device, such as a user device operated by a software developer of the app (or another individual involved with managing or maintaining the app).

Process 300 may also include associating the app with appropriate network devices (block 320). For instance, the request to register the app may include identification information (such as IP addresses, domain names, etc.) of one or more app servers 290 (and/or other types of network devices) that the app is intended and/or permitted to communicate with. For example, if the app being registered is for enabling users to access a social network service, the identification information of the appropriate network devices may include IP addresses of app servers 290 that offer the social network service. In some implementations, the identification information of appropriate network devices may also, or alternatively, be provided by another device and/or at another time. For instance, a developer or manager of the app may provide app security server 280 with identification information of appropriate network devices for the app at some point after the app has been registered. Additionally, or alternatively, the identification information may be provided by the same device as the request to register the app (e.g., app management server 295) or by a different device, such as a user device operated by the app developer or manager. The app security server 290 may create a data structure that logically associates the app with the appropriate network devices.

FIG. 4 is a block diagram of an example data structure 400 that logically associates an app with network devices deemed appropriate for the application to communicate with. As shown, data structure 400 may include app identification information, such as an app name and an app signature, which may be provided by the app developer, the app manager, etc., when the app is registered for network-based security services. Data structure 400 may also include identification information for app servers 290, such as an identifier (e.g., a name) and/or an IP address of each app server 290 that the app is designed to communicate with. While not shown in FIG. 4, in some implementations, a domain name may be used in addition to, or in lieu of, an IP address.

In some implementations, app security server 280 may create data structure 400 in response to the app being registered for network-based security services. As described in detail below, at some point after data structure 400 is created, app security server 280 may receive update information about network devices that are appropriate for the app to communicate with, and may update data structure 400 based on the update information. In some implementations, data structure 400 may include additional information, alternative information, and/or less information than what is shown in FIG. 4. For instance, in some implementations, data structure 400 may not include a title (e.g., "App Security Info"). Additionally, or alternatively, data structure 400 may include a creation date and/or time, a modification date and/or time, identification of an individual or organization in charge of the app, authentication information (e.g., a username and/or password) required to change data structure 400, etc.

Returning to FIG. 3, process 300 may include monitoring network traffic corresponding to the app (block 330). For example, at some point, a copy of the app may be downloaded and installed by a particular user device 210, and when the app is executed by the particular user device 210, the app may cause the particular user device 210 to communicate with one or more network devices, such as app server 290, a web server, a proxy server, etc. In some implementations, the network traffic originating from the particular user device 210 may be routed to (or through) app security server 280, which may enable app security server 280 to inspect and/or analyze the network traffic. In some implementations, app security server 280 may only monitor outgoing network traffic (i.e., network traffic originating from user device 210). Additionally, or alternatively, of all the network traffic originating from user device 210, app security server 280 may identify the network traffic corresponding to the app based on the app signature for the app, which may be present in app security information created for the app (e.g., data structure 400 of FIG. 4) and at least some of the network traffic originating from user device 210.

Process 300 may include determining whether the app is causing user device 210 to communicate with inappropriate network devices (block 340). For instance, app security server 280 may identify the network devices with which the app is communicating and determine whether the network devices are the appropriate network devices (e.g., block 320). In some implementations, app security server 280 may identify the network devices by extracting destination IP addresses used by the app to create the network traffic monitored by app security server 280. In some implementations, outgoing app traffic (e.g., packets) that include an app signature of the app and a destination IP address that matches a trusted app server (or a trusted app server for that particular app) may be considered as traffic that should be allowed. By contrast, traffic that includes the app signature and a destination IP address that does not match a trusted server may be considered as traffic that should potentially be blocked. Additionally, app security server 280 may determine whether the app is communicating with the appropriate network devices by comparing the destination IP addresses from the network traffic to IP addresses of network devices listed in the app security information (e.g., data structure 400 of FIG. 4) for the app.

While not depicted in FIG. 3, in some implementations, if app security server 280 determines that the app is communicating with a network device that is not an approved network device (also referred to herein as an "inappropriate network device"), app security server 280 may perform one or more additional operations to better understand the nature and substance of the communications between the app and the inappropriate network device. For example, initially, app security server 280 may only monitor outgoing network traffic in order to determine whether the app is communicating with appropriate network devices; however, in response to determining that the app is communicating with an inappropriate network device, app security server 280 may begin monitoring both the outgoing network traffic and incoming network traffic associated with the app and the inappropriate network device. In some implementations, doing so may, for example, enable app security server 280 to better understand what information is being communicated between the app and the inappropriate network device, how much information is being transmitted, how often the communications take place, etc.

Process 300 may include notifying app management server 295 when the app is communicating with inappropriate network devices (block 350). For instance, app security server 280 may generate information representing the network activity associated with the app. In some implementations, the information may include an indication of each network device to which the app has sent information and whether each network device is an appropriate network device for the app to communicate with. Additionally, or alternatively, when the app has communicated with an inappropriate network device, the information may include a description of the inappropriate network device, the information sent from the app to the inappropriate network device, the amount of information communicated between the app and the inappropriate network device, the frequency with which the app and the inappropriate network device communicated with one another, etc.

Process 300 may include executing instructions regarding communications between the app and any inappropriate network devices (block 360). For instance, in response to notifying app management server 295 that the app has been communicating with an inappropriate network device, app security server 280 may receive instructions, from app management server 295, about how to manage the app and the inappropriate network device. In some implementations, the instructions may be to immediately block any additional communications between the app and the inappropriate network device.

In some implementations, app security server 280 may automatically block the outgoing app traffic and/or notify the user (e.g., the developer) associated with the app that the app may not be operating properly. In some implementations, the user may have the automatic block removed by indicating to app security server 280 that, for example, app server 290 is a safe network device. In some implementations, the user may indicate that app server 290 is not to be trusted, and app security server 280 may continue to block outgoing app traffic from the app to app server 290, which may be automatically applied to other instances of the app that may be installed on other user devices 210. In some implementations, app security server 280 may provide traffic management rules to PCRF 270 for blocking traffic to and/or from unsafe or untrusted network devices.

In some implementations, the instructions may include one or more additional, or alternative, instructions, such as to continue monitoring the network traffic between the app and the inappropriate network device for a specified period of time, for one or more types of information specified by the instructions, to monitor the network traffic until a threshold amount of information has passed between the app and the inappropriate network device, until a certain type of information (e.g., information that may authenticate app server 290 as a safe network device) has passed between the app and the inappropriate network device, etc. Additionally, or alternatively, some or all of the instructions executed by app security server 280 may be based on one or more security policies that may have been provided to app security server 280 previously, such as during the registration of the app or at some other point in time.

Figure 5:
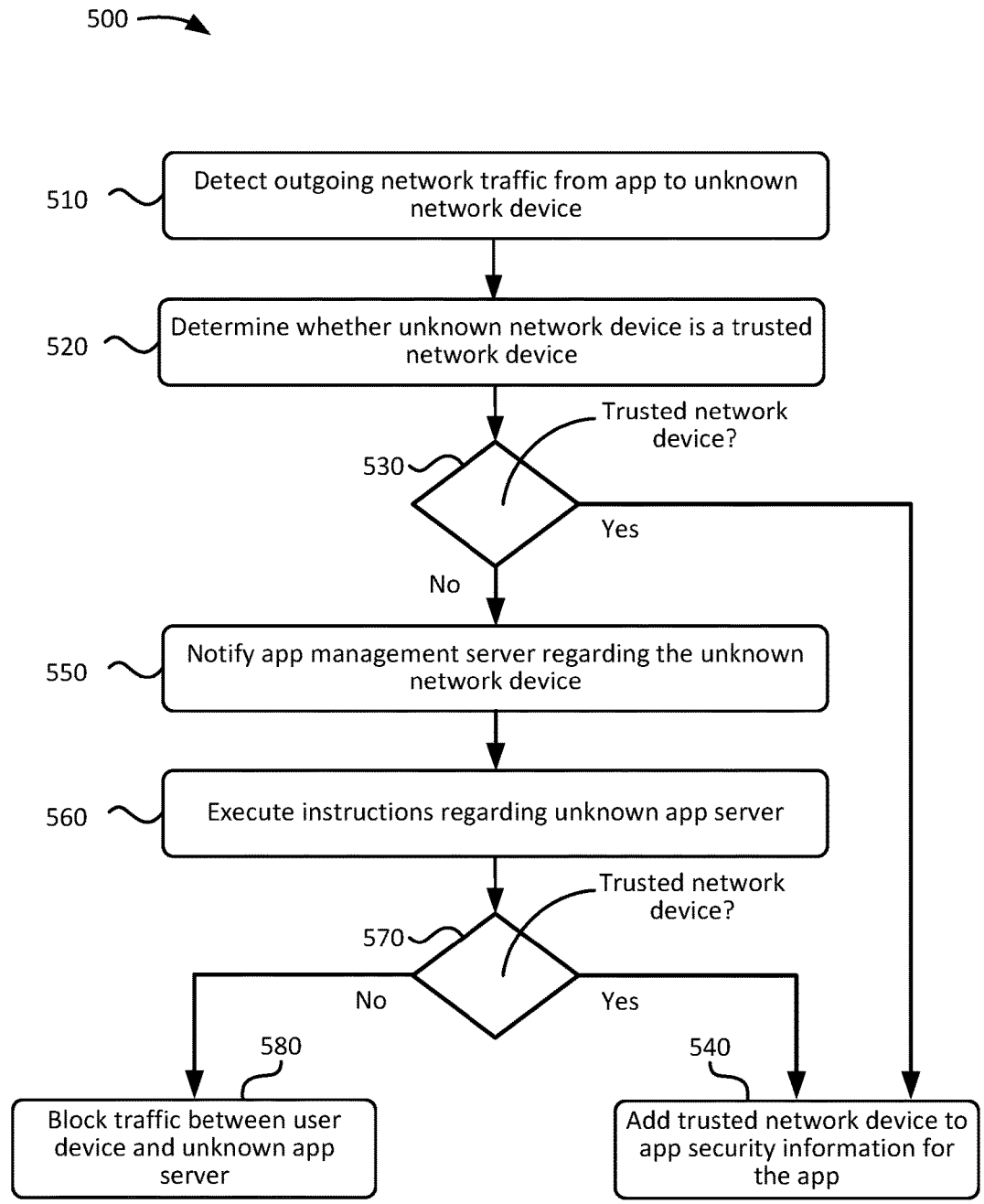

FIG. 5 is a flowchart diagram of an example process 500 for determining whether an unknown network device is appropriate for an app to communicate with. In some implementations, process 500 may be implemented by app security server 280.

Additionally, some or all of the operations of process 500, described below, may be implemented in combination with some or all of the operations of process 300 of FIG. 3. For example, as described above with reference to FIG. 3, app security server 280 may implement a process for ensuring that an app is communicating with appropriate network devices (e.g., block 340), such as app servers 290 indicated in a request to register user device 210 for security services (e.g., block 310) and associated with the app via app security information for the app (e.g., FIG. 4). As such, if the app begins communicating with a network device that is not explicitly indicated as appropriate, app security server 280 may conclude that the network device is, therefore, an inappropriate network device, which may be considered as indicative of spyware, malware, or some other type of malicious being executed in combination with the app.

In summary, therefore, process 300 may describe a process where app security server 280 may assume that a network device is an inappropriate network device unless the network device is explicitly indicated as an appropriate network device in the app security information associated with the app. In other words, even if a network device that is communicating with the app is well-known, is often engaged in communications with apps installed on user device 210, is widely considered a safe and trusted network device, etc., app security server 280 implementing process 300 of FIG. 3 may nevertheless conclude that the network device is inappropriate for the app to communicate with. In light of this issue, FIG. 5 may be implemented, in combination with process 300 to, for example, enable app security server 280 to determine, based on a reputation of the network device, that the network device is appropriate for a particular app to communicate with even though the network device is not explicitly included in the app security information associated with the app.

As shown, process 500 may include detecting outgoing network traffic from an app to an unknown network device (block 510). For example, app security server 280 may monitor network traffic originating from a particular app installed on user device 210 and identify the network device (e.g., app server 290) intended to receive the network traffic. App security server 280 may identify the app based on an app signature in the network traffic. App security server 280 may also determine whether the network device is an appropriate network device for the app to be communicating with by determining whether the network device is described in the app security information for the app an example of which is discussed above with reference to FIG. 4. When app security server 280 determines that the network device is not explicitly identified by the app security information, instead of assuming that the network device is an inappropriate network device for the app, app security server 280 may temporarily designate the network device as an unknown network device since, for example, the relationship between the app and the network device, and the legitimacy thereof, is not conclusively resolved by the app security information for the app.

Process 500 may include determining whether the unknown network device is a trusted network device (block 520). For instance, in response to determining that the network device intended to receive information from the app is not described in the app security information for the app (an example of which is discussed above with reference to FIG. 4), app security server 280 may access and/or analyze other types of information in order to determine whether the unknown network device can nevertheless be trusted (e.g., whether the app communicating with the network device is likely indicative of spyware, malware, or another type of malicious software having infiltrated the app).

An example of such information may include a list of network devices that have been pre-approved for communicating with apps registered for the network-based security services provided by app security server 280. Another example of such information may include a reputation of an organization that owns and operates the network device, a reputation of the network device itself (e.g., whether the network device is known to have been involved with malicious software in the past), and/or whether the known functions of the network device would likely enable one or more functions of the app (e.g., the app is known to use geographic information to perform one or more functions and the network device is known to provide geographic information). Additional examples of such information may include whether the type of information, the quantity of information, frequency of information, etc., sent by user device 210 to the network device, is consistent with the manner in which the app and the network device would communicate for legitimate purposes (e.g., the information sent from user device 210 to the network device is consistent, in type and quantity, with a request for geographic information). The analysis used to determine whether an unknown network device may be a trusted network device may be referred to generally herein as a "features, functions, and reputation analysis"); however, it should be appreciated that the types of information, analytical tool and mechanism, etc., that are actually used to make this determination may vary depending on the implementation.

In some implementations, some or all of the information used by app security server 280 to determine whether an unknown network device is a trusted network device may be collected, stored, and/or periodically updated by app security server 280. For instance, information regarding the features and functions of the app may be provided to app security server 280 while the app is being registered for network-based security servers and/or at some point thereafter. In some implementations, some or all of the information may be obtain from another device within a network, such as the wireless telecommunications network described above with reference to FIG. 2. In some implementations, some or all of the information may be obtained by app security server 280 from an external device, such as one or more web servers, app servers, proxy servers, etc., that are designed to maintain up-to-date information regarding the information described above.

As shown in FIG. 5, if the unknown network device is a trusted network device (block 530—Yes), process 500 may include adding the trusted network device to the app security information for the app (block 540). In some implementations, if at some later point, the app once again begins to communicate with the network device, app security server 280 may more quickly determine that the network device is appropriate for the app by accessing the app security information for the app instead of, for example, evaluating the features and functions of the network device with respect to the app, the reputation of the organization that owns and operates the network device, the reputation of the network device itself, etc.

By contrast, if the unknown network device is not to be trusted (block 530—No), process 500 may include notifying app manager server 295 regarding the unknown network device (block 550). In some implementations, this may include app security server 280 indicating to app manager server 295 that the network device is not an appropriate network device (per the app security information for the app) or a trusted network device (per the features, functions, and reputation analysis described above with reference to block 520). In some implementations, the features, functions, and reputation analysis performed by app security server 280 may generate a variety of information, some or all of which, may be provided to app management server 295. For example, the features, functions, and reputation analysis may produce a trustworthiness score representing how trustworthy the unknown network server appears to be. The trustworthiness score may include, for example, a numeric value that is somewhere on a numeric index defined by a preselected minimum score (e.g., 0) and a preselected maximum score (e.g., 100). As another example, app security server 280 may provide app management server 295 with historical information corresponding to the unknown network server, such as reported instances of the unknown network device being associated with one or more types of malicious software. Similar information may be provided to the app management server 295 regarding the organization that owns and operates the unknown network device.

Process 500 may include executing instructions regarding communications between the app and any inappropriate network devices (block 560). For instance, in response to notifying app management server 295 regarding the unknown network device, app security server 280 may receive instructions, from app management server 295, about whether the unknown network device should, nevertheless, be treated as a trusted network device. As such, app security server 280 may provide information and recommendations, to app management server 295, about whether the unknown network device should be trusted, but still enable app management server 295 to override the recommendations and continue permitting the app to communicate with the network device. This may, for example, enable a software manager, a software developer, or another authorized individual to maintain ultimate control over whether the app may or may not communicate with a particular network device.

For example, as shown in FIG. 5, if the instructions from app management server 295 indicate that the unknown network device is a trusted network device (block 570—Yes), process 500 may include adding the trusted network device to the app security information for the app (block 540). As mentioned above, if at some later point, the app again begins to communicate with the network device, app security server 280 may more quickly determine that the network device is appropriate for the app to communicate with, by accessing the app security information for the app, instead of, for example, performing another features, functions, and reputation analysis for the network device. By contrast, if the unknown network device is not to be trusted (block 570—No), process 500 may include blocking traffic between the app and the network device or all network traffic to and from the untrusted app server 290 (block 580).

In some implementations, the instructions may include one or more additional, or alternative, instructions, such as to continue monitoring the network traffic between the app and the unknown network device for a specified period of time, for one or more types of information, until a threshold amount of information has passed between the app and the unknown network device, until a certain type of information has passed between the app and the unknown network device, etc. The instructions may also include one or more conditions for determining whether the unknown network device should be trusted. For instance, the instructions may indicate that if, at a specified time (or within a specified duration of time) the app sends certain information (e.g., a particular code) to the unknown network device (or vice versa), then app security server 280 should treat the unknown network device as a trusted network device. In some implementations, some or all of the instructions executed by app security server 280 may be based on one or more security policies that may have been provided to app security server 280 previously, such as during the registration of the app or at some other point in time.

FIGS. 6-12 are block diagrams of example information and operations for providing network-based security services to an app installed on a user device. As discussed below, the examples of FIGS. 6-12 may involve a scenario where an app, installed on user device 210, communicates with multiple app servers, which may be examples of app servers 290 described above with reference to FIG. 2. However, one or more of the examples of FIGS. 6-12 may be equally applicable to scenarios involving one or more other types of network devices, such as a web server, a FTP server, a proxy server, etc.

Figure 6:
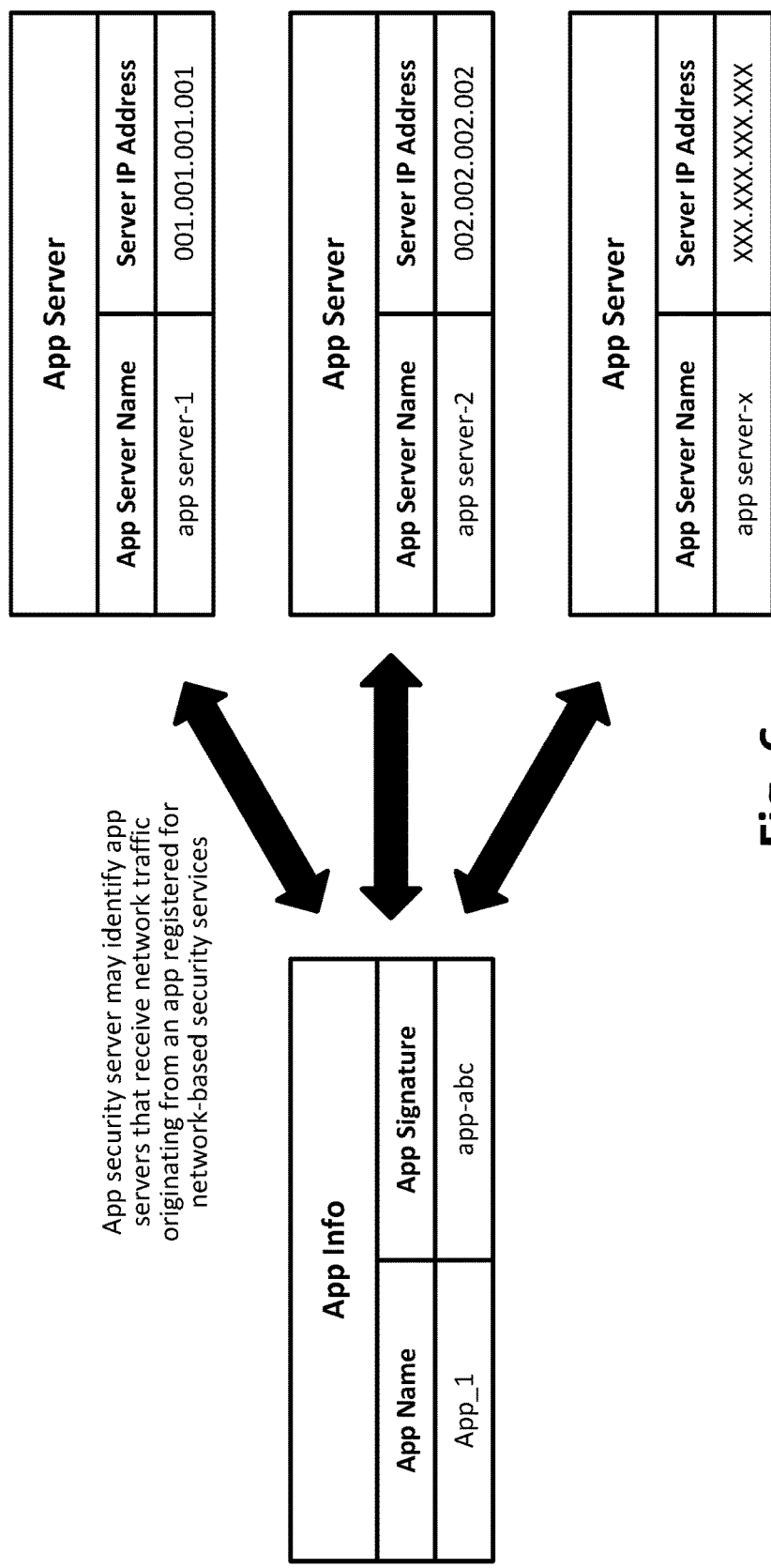
FIG. 6 is a block diagram of an example of identifying application servers receiving outgoing traffic from an application.

FIG. 6 is a block diagram of an example for identifying app servers receiving outgoing traffic from an app. The app may have been registered to receive network-based security services from app security server 280 and installed on user device 210. Additionally, user device 210 may be connected to a network, such as the wireless telecommunications network described in FIG. 2, which may enable the app to communicate with one or more app servers 290.

App security server 280 may monitor network traffic that passes through the network that enables the app to communicate with the app servers. App security server 280 may identify the network traffic originating from the app based on app identification information that may have been previously provided app security server 280 (e.g., when the app was registered for the network-based security services). As shown in FIG. 6, the app identification information may include an app name and/or an app signature that uniquely identifies the app. Upon identifying network traffic originating from the app, app security server 280 may identify app servers intended to receive information from the app. In some implementations, app security server 280 may identify the app servers based on IP addresses of the app servers, which may be included in the network traffic originating from the app. As such, app security server 280 may identify network traffic originating from the app based on an app signature included in the network traffic and/or may identify the app servers intended to receive the network traffic based on IP addresses of the app servers that are also included in network traffic.

Figure 7:
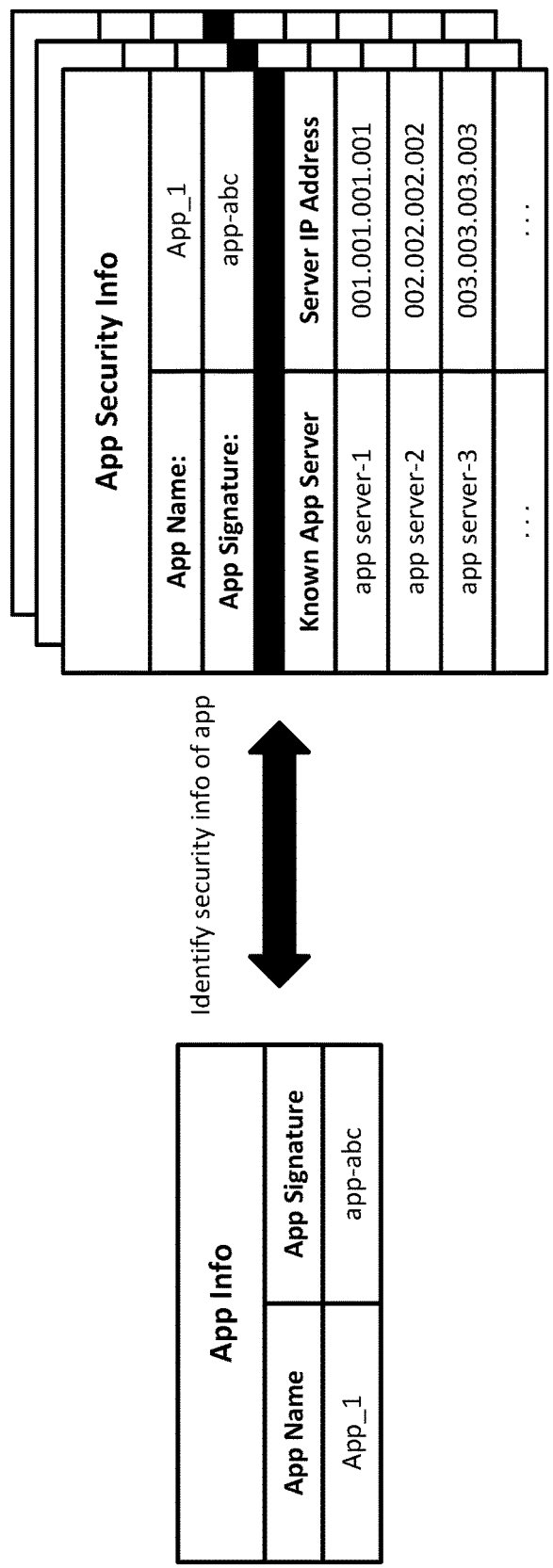
FIG. 7 is a block diagram of an example of identifying application security information corresponding to a particular application.

FIG. 7 is a block diagram of example information that may be used to identify app security information corresponding to a particular app. For example, once app security server 280 identifies the app servers intended to receive information from the app, app security server 280 may identify app security information associated with the app. In some implementations, app security server 280 may include app security information for multiple apps that may be registered to receive network-based security services from app security server 280. As such, the app security information for each app may include a copy of the app identification information (e.g., the app name and/or the app signature), which may be used by app security server 280 to identify the appropriate app security information.

Figure 8:
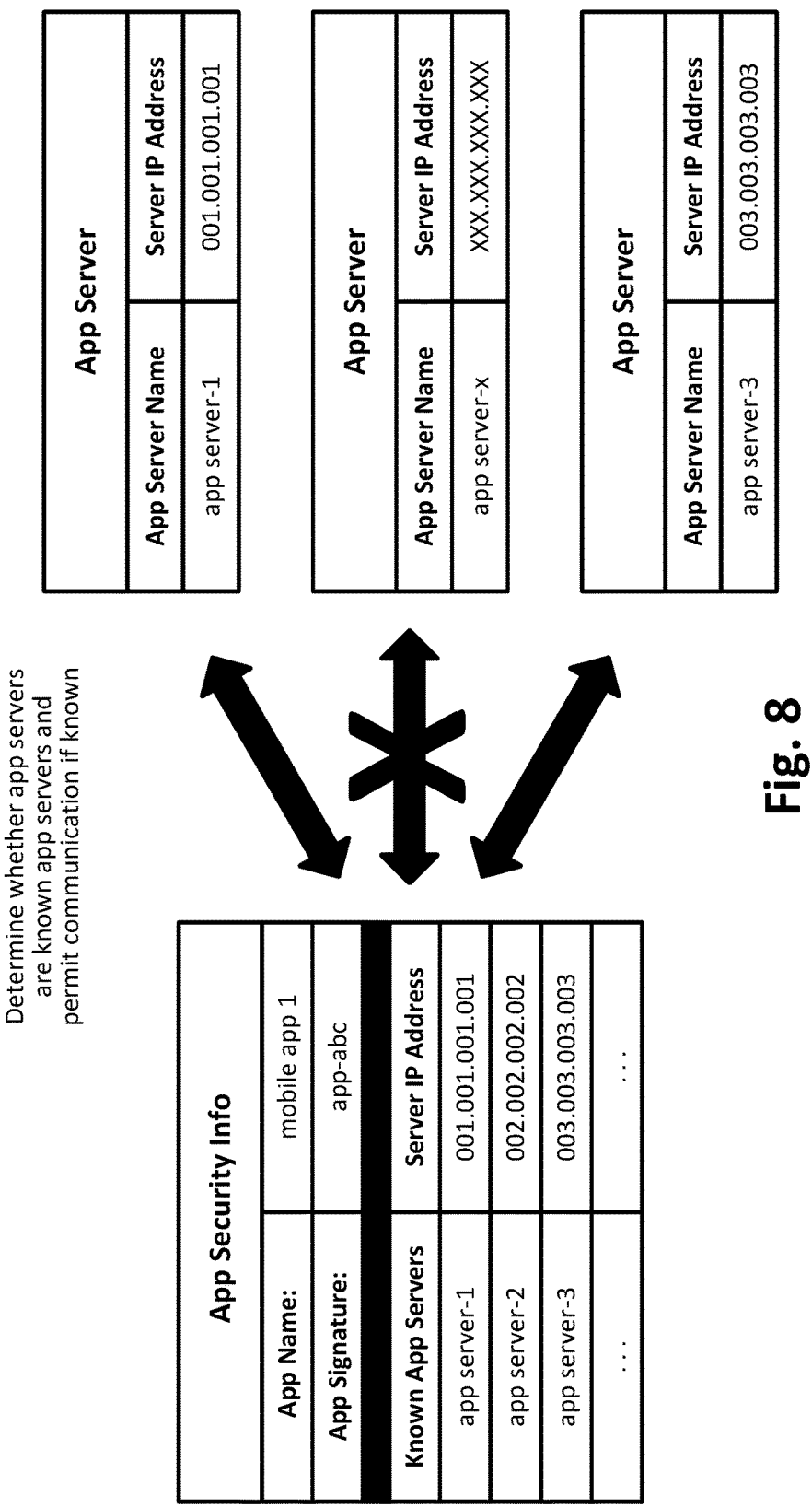

FIG. 8 is a block diagram of an example of determining whether certain app servers are appropriate for an app to communicate with. For instance, app security server 280 may compare IP addresses of app servers, from the app security information, with the IP addresses of the app servers receiving information from an app. A match between the IP addresses (e.g., the IP address: 001.001.001.001 and 003.003.003.003) may indicate that the app is operating as intended and that the app servers are appropriate. By contrast, if an IP address of an app server receiving information from the app is not found in the security information, such as the IP address XXX.XXX.XXX.XXX of app server-x, app security server 280 may determine the app is not operating as intended.

In some implementations, this may cause app security server 280 to notify app management server 295 that the app may be infected by spyware, malware, or another type of malicious software that is causing the app to send information to the app server not represented in the app security information. By contrast, in some implementations, determining that an app server receiving information from the app is not represented in the app security information may cause app security server 280 to further investigate whether the app communicating with the unrepresented (or unknown) app server is consistent with the app operating as intended as described below with reference to FIG. 9.

Figure 9:
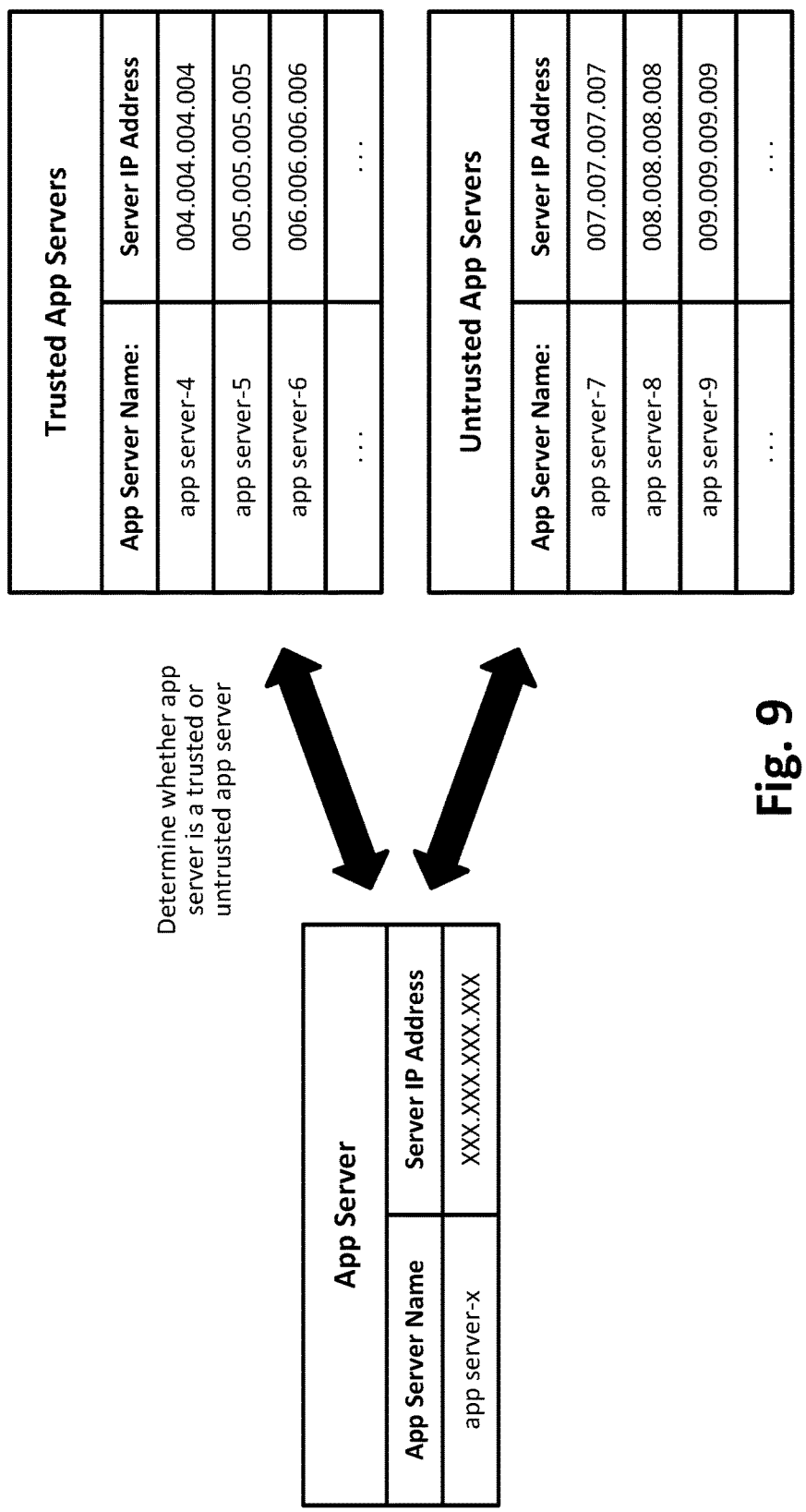
FIG. 9 is a block diagram of an example of determining whether a particular application server is a trusted application server or an untrusted application server.

FIG. 9 is a block diagram of an example of determining whether a particular app server is a trusted application server or an untrusted application server. For instance, app security server 280 may determine whether the unknown app server is represented in a list of app servers that have been previously identified as network devices that can be trusted to communicate with apps receiving security services from app security server 280. In some implementations, if the unknown app server is not represented in the list of trusted app servers, app security server 280 may perform one or more additional operations to determine whether the unknown app server can be trusted. Several examples of such operations are discussed above with reference to block 520 of FIG. 5. App security server 280 may also, or alternatively determine whether the unknown app server is represented in a list of app servers that have been previously identified as untrustworthy (e.g., due to the unknown app server having a history of being associated with one or more types of malicious software).

Figure 10:
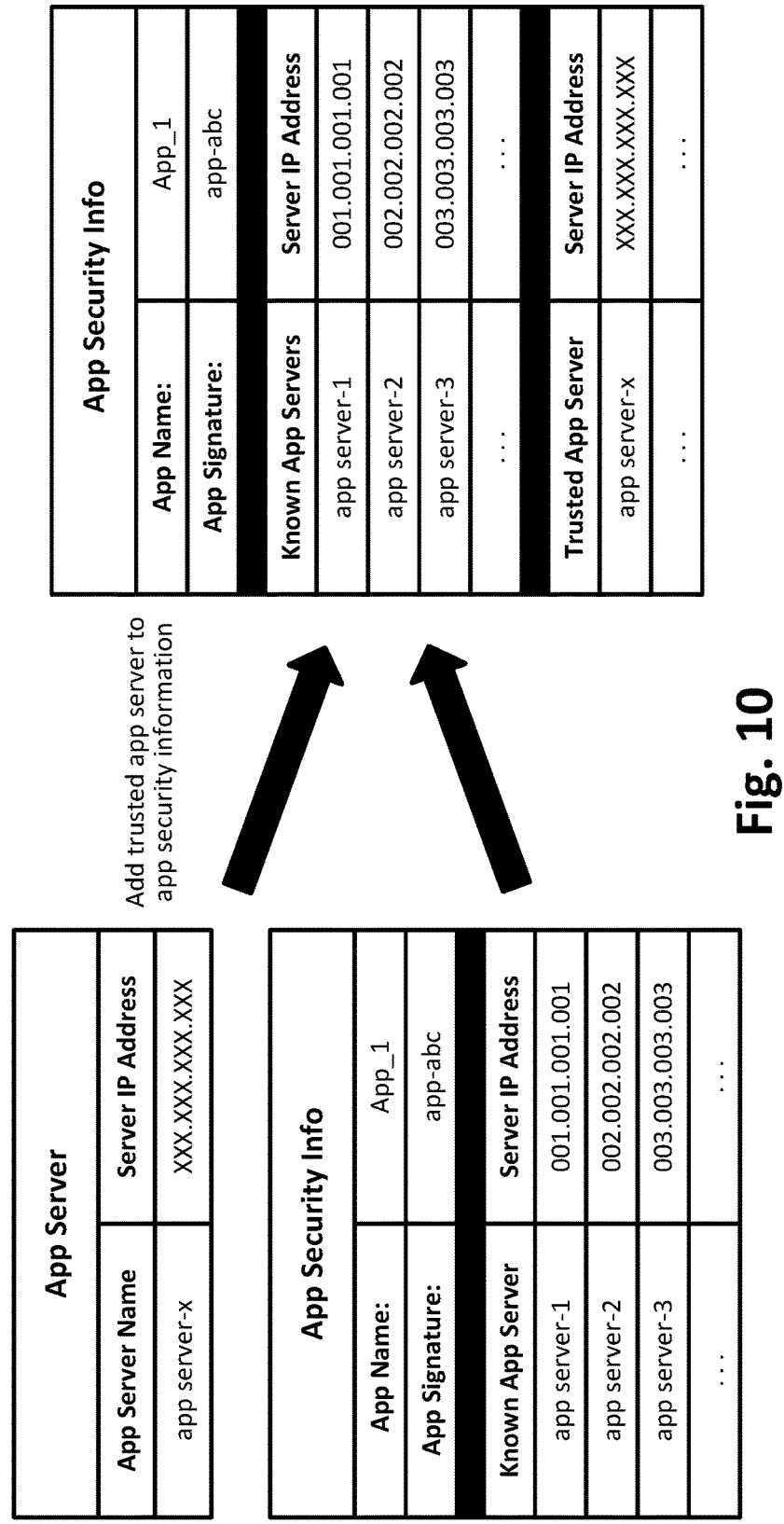
FIGS. 10 and 11 are block diagrams of an example of updating application security information with trustworthy and untrustworthy application servers.
Figure 11:
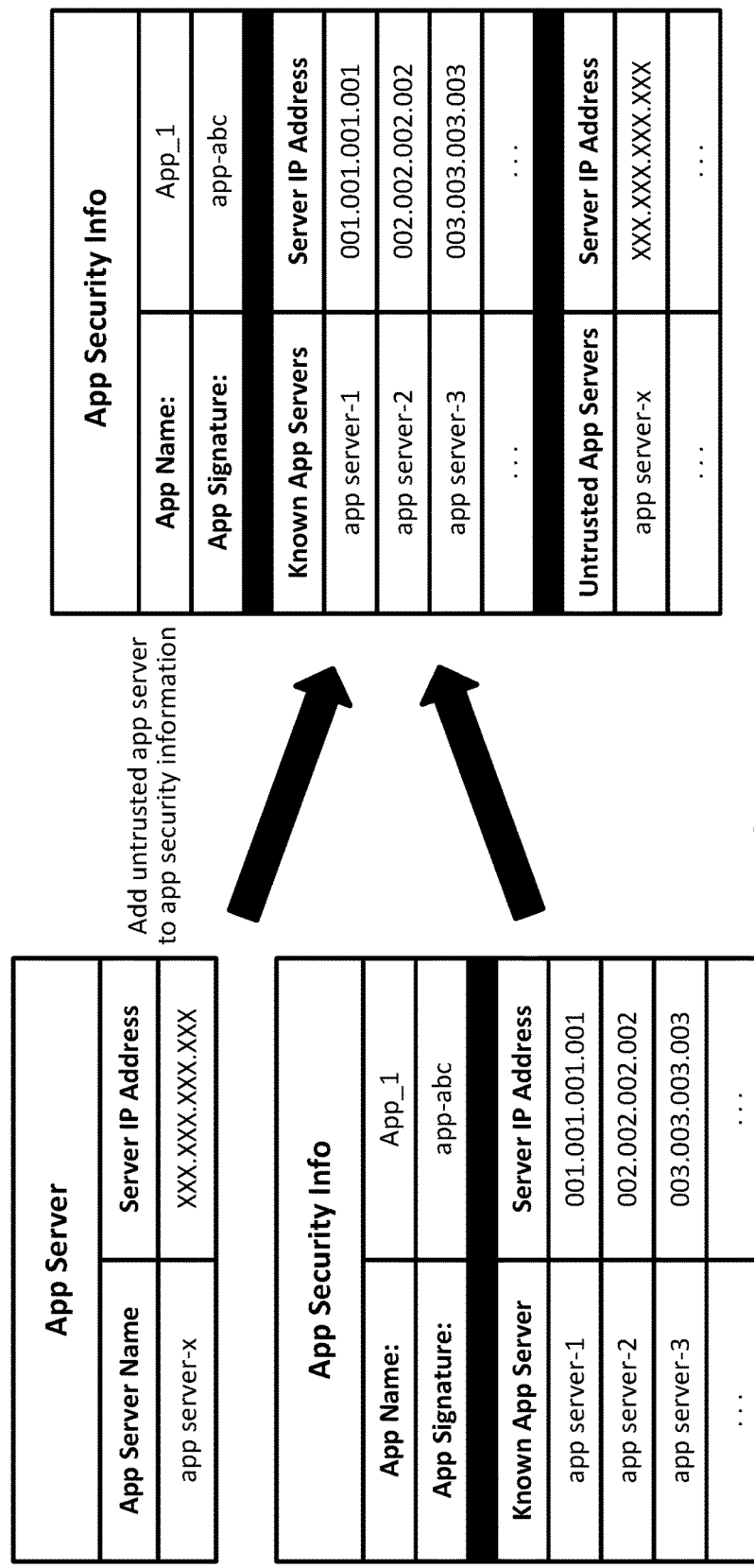

FIGS. 10 and 11 are block diagrams of an example of updating app security information with trustworthy and untrustworthy app servers. As described herein, a known app server may include an app server that was explicitly identified by a developer or manager of the app (e.g., during registration of the app) as being safe for the app to communicate with. By contrast, a trusted app server may include an app server that was not explicitly identified as a trusted network device, but has a good enough reputation (or has otherwise been identified) to be a trustworthy network device for the app to communicate with.

Referring to FIG. 10, if the unknown app server is determined to be trustworthy, app security server 280 may update the app security information of the app to include the (previously) unknown app server. As shown, app security server 280 may update the app security information to include identification information of the previously unknown app server (e.g., the domain name and/or the IP address of the unknown app server). App security server 280 may also update the application security information to indicate that the newly added identification information corresponds to an app server that can be trusted to communicate with the app (by, for example, including the identification information in a list of trusted app servers).

Referring now to FIG. 11, app security server 280 may also update the app security information of the app if the unknown app server is determined to be untrustworthy. For instance, as shown in FIG. 11, app security server 280 may update the app security information to include identification information of the unknown app server (e.g., the name and/or the IP address of the unknown app server). App security server 280 may also update the application security information to indicate that the newly added identification information corresponds to an app server that is not trusted (by, for example, including the identification information in a list of untrusted app servers).

Figure 12:
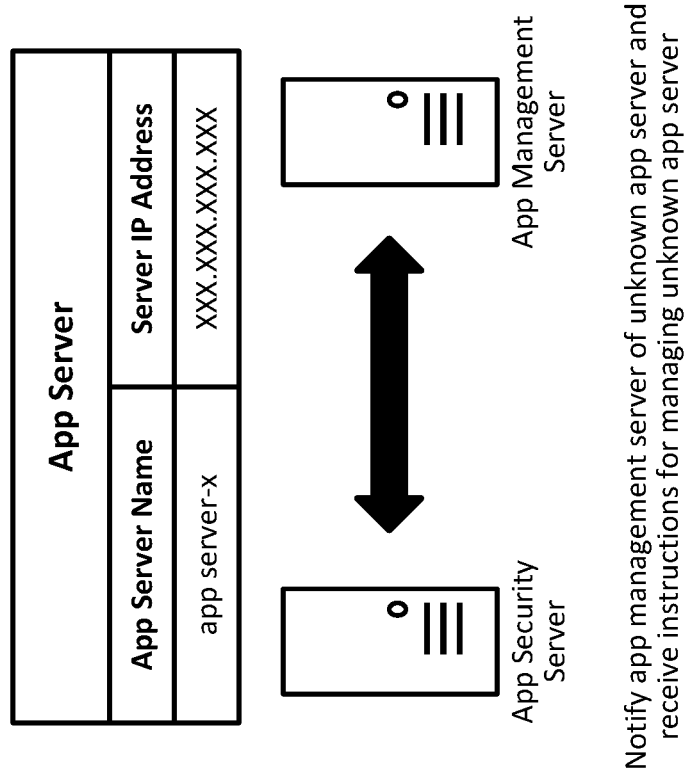
FIG. 12 is a block diagram of an example operation for obtaining instructions regarding an unknown app server.

FIG. 12 is a diagram of an example operation for obtaining instructions regarding an unknown app server. For example, if app security server 280 is unable to determine that the unknown app server is trustworthy (e.g., by not being represented in the list of trusted app server or the list of untrusted app servers), app security server 280 may notify app management server 295 about the unknown app server, which may include providing identification information (e.g., a name and/or the IP address of the unknown app server) and an indication the trustworthiness of the unknown app server could not be determined. In response to the notification, app security server 280 may receive instructions, from app management server 295, about what to do with the unknown app server. As described above with reference to blocks 540, 570, and 580, the instructions may cause app security server 280 to treat the unknown server as a trusted network server (e.g., by updating the app security information for the app to include the unknown app server) or as an untrusted network device (e.g., by preventing user device 210 from providing the unknown app server with any additional information).

Figure 13:
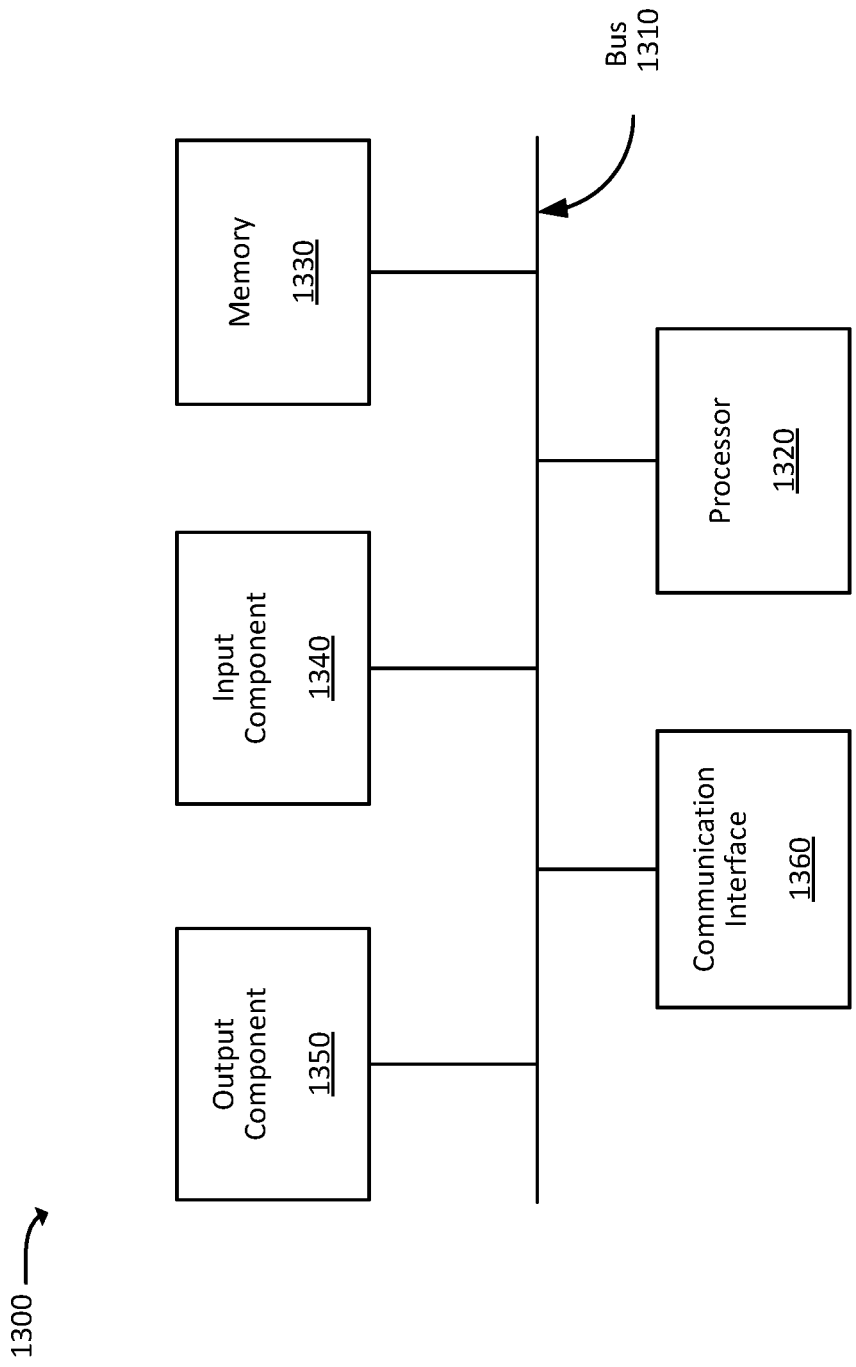
FIG. 13 is a block diagram of example components of a device.

FIG. 13 is a diagram of example components of a device 1300. Each of the devices illustrated in FIGS. 1, 2, and 12 may include one or more devices 1300. Device 1300 may include bus 1310, processor 1320, memory 1330, input component 1340, output component 1350, and communication interface 1360. In another implementation, device 1300 may include additional, fewer, different, or differently arranged components. As described herein, a component may be implemented by hardware circuitry, software logic, and/or some combination thereof.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes (LEDs), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 3, and 5-12 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network server device, comprising:
   a non-transitory memory device storing a plurality of processor-executable instructions; and
   a processor configured to execute the processor-executable instructions, wherein executing the processor-executable instructions causes the processor to:
      receive a request to register a software application for a network-based authentication service offered by the network server service device, the software application installable on a user device registered with a network to which the network server device pertains, the request including:
         an identifier of the software application, wherein the identifier includes an application name or signature that uniquely identifies the software application, and
         one or more identifiers of one or more application servers with which the software application is designed to communicate via the network;
      store information associating the identifier of the software application with the one or more identifiers of the one or more application servers;
      monitor network traffic within the network and corresponding to a particular user device upon which the software application is installed, the network traffic originating from the software application installed on the particular user device, the monitoring being performed by identifying the identifier in the network traffic;
      identify, based on the monitoring, particular network traffic from the particular user device that includes the identifier of the software application;
      identify, based on the monitoring an identifier of a particular application server towards which the particular network traffic is destined;
      determine, based on identifying that the particular traffic includes the identifier of the software application, whether the identifier of the particular application server corresponds to an identifier of at least one application server, of the one or more application servers with which the software application is designed to communicate;
      when the identifier of the particular application server corresponds to the identifier of the at least one application server of the application servers with which the software application is designed to communicate, permit the software application installed on the particular user device to communicate with the particular application server via the network; and
      when the identifier of the particular application server does not correspond to the identifier of the at least one application server of the application servers with which the software application is designed to communicate, prohibit the software application installed on the particular user device from communicating with the particular application server via the network.

2. The network server device of claim 1, wherein, when the identifier of the particular application server does not correspond to the identifier of the at least one application server, prior to a prohibition of the software application installed on the particular user device communicating with the particular application server, the processor-executable instructions cause the processor to:
   determine whether the particular application server corresponds to a trustworthy application server for receiving information originating from the software application installed on the user device; and
   when the particular application server corresponds to the trustworthy application server,
      permit the software application installed on the particular user device to communicate with the particular application server via the network, and
   when the particular application server does not correspond to the trustworthy application server,
      prohibit the software application installed on the particular user device from communicating with the particular application server via the network.

3. The network server device of claim 2, wherein the determination of whether the particular application server corresponds to the trustworthy application server, is based on at least one of:
   a list of identifiers, accessible by the network server, corresponding to trusted application servers,
   a reputation of the particular application server for being associated with malicious software, or
   a reputation of an organization, associated with the particular application server, for being associated with malicious software.

4. The network server device of claim 2, wherein, when the particular application server does not correspond to the trustworthy application server, prior to a prohibition of the software application installed on the particular user device communicating with the particular application server, the processor-executable instructions cause the processor to:
   determine whether the particular application server corresponds to an untrustworthy application server for receiving information originating from the software application installed on the user device, and
   when the particular application server corresponds to the untrustworthy application server,
      prohibit the software application installed on the particular user device from communicating with the particular application server via the network, and
   when the particular application server does not correspond to the untrustworthy application server,
      notify an application management server, corresponding to the software application, of communications between the software application installed on the particular user device the particular application server and the particular application server not being determined as trustworthy or untrustworthy.

5. The network server device of claim 4, wherein the determination of whether the particular application server corresponds to the untrustworthy application server is based on at least one of:
   a list of identifiers, accessible by the network server, corresponding to untrusted application servers,
   a reputation of the particular application server for being associated with malicious software, or
   a reputation of an organization associated with the particular application server for being associated with malicious software.

6. The network server device of claim 4, wherein the processor-executable instructions cause the processor to:
   receive, from the application management server, instructions regarding the software application and the particular application server, wherein the instructions comprise:

instructions to permit the software application to communicate with the particular application server via the network, or instructions to prohibit the software application from communicating with the particular application server via the network; and execute the instructions from the application management server.

7. The network server device of claim 6, wherein:

the instructions to permit the software application to communicate with the particular application server via the network further include instructions to associate the identifier of the software application with identification information of the particular application server and an indication that the software application is permitted to communicate with the particular application server, and the instructions to prohibit the software application to communicate with the particular application server via the network further include instructions to associate the identifier of the software application with identification information of the particular application server and an indication that the software application is prohibited from communicating with the particular application server.

8. A method, comprising:

receiving, by a network server of a network that is owned and operated by a network service provider, a request to register a software application for a network-based authentication service, the software application being installable on a user device registered with the network, the request including:

an identifier of the software application, wherein the identifier includes an application name or signature that uniquely identifies the software application, and one or more identifiers of one or more application servers with which the software application is designed to communicate via the network;

monitoring, by the network server, network traffic within the network and corresponding to a particular user device upon which the software application is installed, the network traffic originating from the software application installed on the particular user device, the monitoring being performed by identifying the identifier in the network traffic;

identifying, by the network server and based on the monitoring, particular network traffic from the particular user device that includes the identifier of the software application;

identifying, by the network server and based on the monitoring, an identifier of a particular application server towards which the particular network traffic is destined;

determining, by the network server and based on identifying that the particular traffic includes the identifier of the software application, whether the identifier of the particular application server corresponds to an identifier of at least one application server, of the application servers with which the software application is designed to communicate;

when the identifier of the particular application server corresponds to the identifier of the at least one application server of the application servers with which the software application is designed to communicate, permitting, by the network server, the software application installed on the particular user device to communicate with the particular application server via the network; and when the identifier of the particular application server does not correspond to the identifier of the at least one application server of the application servers with which the software application is designed to communicate, prohibiting, by the network server, the software application installed on the particular user device from communicating with the particular application server via the network.

9. The method of claim 8, further comprising:

when the identifier of the particular application server does not correspond to the identifier of the at least one application server, prior to the prohibiting of the software application installed on the particular user device from communicating with the particular application server, determining whether the particular application server corresponds to a trustworthy application server for receiving information originating from the software application installed on the user device; and when the particular application server corresponds to the trustworthy application server, permitting the software application installed on the particular user device to communicate with the particular application server via the network, and when the particular application server does not correspond to the trustworthy application server, prohibiting the software application installed on the particular user device from communicating with the particular application server via the network.

10. The method of claim 9, wherein the determining of whether the particular application server corresponds to the trustworthy application server is based on at least one of:

a list of identifiers, accessible by the network server, corresponding to trusted application servers, a reputation of the particular application server for being associated with malicious software, or a reputation of an organization, associated with the particular application server, for being associated with malicious software.

11. The method of claim 9, further comprising:

when the particular application server does not correspond to the trustworthy application server, prior to prohibiting the software application installed on the particular user device from communicating with the particular application server, determining whether the particular application server corresponds to an untrustworthy application server for receiving information originating from the software application installed on the user device, and when the particular application server corresponds to the untrustworthy application server, prohibiting the software application installed on the particular user device from communicating with the particular application server via the network, and when the particular application server does not correspond to the untrustworthy application server, notifying an application management server, corresponding to the software application, of communications between the software application installed on the particular user device the particular application server and the particular application server not being determined as trustworthy or untrustworthy.

12. The method of claim 11, wherein the determining of whether the particular application server corresponds to the untrustworthy application server is based on at least one of:

a list of identifiers, accessible by the network server, corresponding to untrusted application servers, a reputation of the particular application server for being associated with malicious software, or a reputation of an organization associated with the particular application server for being associated with malicious software.

13. The method of claim 11, further comprising:

receiving, from the application management server, instructions regarding the software application and the particular application server, wherein the instructions comprise:

instructions to permit the software application to communicate with the particular application server via the network, or instructions to prohibit the software application from communicating with the particular application server via the network; and executing the instructions from the application management server.

14. The method of claim 13, wherein the instructions to permit the software application to communicate with the particular application server via the network further include:

instructions to associate the identifier of the software application with identification information of the particular application server and an indication that the software application is permitted to communicate with the particular application server.

15. The method of claim 13, wherein the instructions to prohibit the software application to communicate with the particular application server via the network further include:

instructions to associate the identifier of the software application with identification information of the particular application server and an indication that the software application is prohibited from communicating with the particular application server.

16. The method of claim 8, wherein the prohibiting of the software application installed on the particular user device from communicating with the particular application server via the network, includes:

installing a rule onto a Policy and Charging Rules Function (PCRF) of the network, the rule causing the network traffic destined to the particular application server to not be forwarded to the particular application server by a packet network gateway (PGW) of the network.

17. The method of claim 8, further comprising:

notifying a user, associated with the software application, that the software application appears to be operating improperly;

after notifying the user, receiving instructions from the user that the software application is permitted to communicate with the particular application server; and enabling, based on the instructions received from the user, the software application to communicate with the particular application server.

18. A non-transitory computer-readable medium storing a set of processor-executable instructions, which, when executed by one or more processors of a network server device, cause the one or more processors to:

receive a request to register a software application for a network-based authentication service offered by the network service device, the software application installable on a user device registered with a network to which the network server device pertains, the request including:

an identifier of the software application, wherein the identifier includes an application name or signature that uniquely identifies the software application, and one or more identifiers of one or more application servers with which the software application is designed to communicate via the network;

store information associating the identifier of the software application with the one or more identifiers of the one or more application servers;

monitor network traffic within the network and corresponding to a particular user device upon which the software application is installed, the network traffic originating from the software application installed on the particular user device;

identify, based on the monitoring, particular network traffic from the particular user device that includes the identifier of the software application;

identify, based on the monitoring, an identifier of a particular application server towards which the particular network traffic is destined;

determine, based on identifying that the particular traffic includes the identifier of the software application, whether the identifier of the particular application server corresponds to an identifier of at least one application server, of the one or more application servers with which the software application is designed to communicate;

when the identifier of the particular application server corresponds to the identifier of the at least one application server of the application servers with which the software application is designed to communicate, permit the software application installed on the particular user device to communicate with the particular application server via the network; and when the identifier of the particular application server does not correspond to the identifier of the at least one application server of the application servers with which the software application is designed to communicate, prohibit the software application installed on the particular user device from communicating with the particular application server via the network.

19. The non-transitory computer-readable medium of claim 18, wherein the processor-executable instructions, to prohibit the software application installed on the particular user device from communicating with the particular application server via the network, further include processor-executable instructions to:

install a rule onto a Policy and Charging Rules Function (PCRF) of the network, the rule causing the network traffic destined to the particular application server to not be forwarded to the particular application server by a packet network gateway (PGW) of the network.

20. The non-transitory computer-readable medium of claim 18, wherein the set of processor-executable instructions further includes processor-executable instructions to:

notify a user, associated with the software application, that the software application appears to be operating improperly;

after notifying the user, receive instructions from the user that the software application is permitted to communicate with the particular application server; and enable, based on the instructions received from the user, the software application to communicate with the particular application server.

* * * * *